United States Patent [19]

Jun et al.

[11] Patent Number: 4,900,700

[45] Date of Patent: Feb. 13, 1990

[54] SILICON NITRIDE-TITANIUM NITRIDE BASED CERAMIC COMPOSITES AND METHODS OF PREPARING THE SAME

[75] Inventors: Choll K. Jun, Franklin, Mich.; Milivoj K. Brun, Saratoga, N.Y.

[73] Assignee: Carboloy Inc., Warren, Mich.

[21] Appl. No.: 200,659

[22] Filed: May 31, 1988

[51] Int. Cl.$^4$ ............................................. C04B 35/58
[52] U.S. Cl. ........................................ 501/78; 501/96; 501/128; 501/152; 501/153; 501/154
[58] Field of Search .................... 501/96, 98, 128, 152, 501/153, 154

[56] References Cited

U.S. PATENT DOCUMENTS

| | | | |
|---|---|---|---|
| 4,127,416 | 11/1978 | Lumby et al. ......................... | 501/98 |
| 4,490,319 | 12/1984 | Lee et al. .............................. | 501/93 |
| 4,609,631 | 9/1986 | Messier et al. ........................ | 501/35 |
| 4,711,644 | 12/1987 | Yeckley et al. ....................... | 501/97 |

*Primary Examiner*—Olik Chaudhuri
*Assistant Examiner*—Andrew Griffis
*Attorney, Agent, or Firm*—Hedman, Gibson, Costigan & Hoare

[57] ABSTRACT

A ceramic composite containing less than 90% of a single phase silicon aluminum oxynitride and titanium nitride in an amount of up to about 10% by weight. Also disclosed are silicon nitride containing compositions for forming the composite and methods of producing the composite from the composition.

5 Claims, No Drawings

SILICON NITRIDE-TITANIUM NITRIDE BASED CERAMIC COMPOSITES AND METHODS OF PREPARING THE SAME

FIELD OF THE INVENTION

The present invention is directed to ceramic composites containing silicon nitride in the form of a solid solution and titanium nitride and methods of preparing the same preferably by sintering under pressure wherein the ceramic composites employed as cutting tools are particularly adapted for machining superalloys, cast irons, and steel.

BACKGROUND OF THE INVENTION

Silicon nitride based ceramic cutting tools have become increasingly important in recent years for machining superalloys, steel and cast iron. Particular attention has been directed to ceramic composites containing silicon nitride, alumina and aluminium nitride, the so-called "SIALON" composites. These compositions are based on the solid solubility of both aluminum oxide and aluminum nitride in silicon nitride.

For example, Jack, et al., U.S. Pat. No. 3,991,116 discloses a ceramic material containing at least 90% of SIALON. Subsequent work has focused on combining SIALON materials with various additives to improve cutting performance. For example, Lumby, et al., U.S. Pat. No. 4,323,323 discloses a single phase SIALON compound and a second phase containing a rare earth metal such as yttria. Komatsu, et al., U.S. Pat. No. 4,327,187 discloses a sintered ceramic body containing SIALON and an oxide of titanium, magnesium or zirconium.

Efforts have been made to improve the cutting characteristics of SIALON based ceramics by also employing an adherent coating on the ceramic composite. For example, Sarin, et al., U.S. Pat. No. 4,424,066 discloses the use of an adherent alumina coating layer on a ceramic composite substrate body and Sarin, et al., U.S. Pat. No. 4,426,209 discloses an adherent refractory metal carbide layer.

In addition to the use of additives and coating layers, efforts have been made to improve the processing of the SIALON containing composite. Lumby, et al., Reexamined U.S. Pat. No. B1 4,127,416 discloses a pressureless sintering process for forming a ceramic product containing at least 80% of a single phase SIALON compound. Another method of forming a SIALON ceramic material is disclosed in Lumby, et al., U.S. Pat. No. 4,113,503 which requires the formation of a ceramic intermediary which is then ground into a powder and heated with or without pressure in the presence of silicon nitride and silica.

Buljan, et al., U.S. Pat. No. 4,421,528 describes composite cutting tools produced by sintering a mixture of specified amounts of silicon nitride, aluminum oxide and yttria and then combining the sintered product with a hard refractory material such as titanium nitride. Despite these efforts, there is still room for significant improvement in the cutting characteristics of SIALON based composite cutting tools.

It is therefore an object of the invention to provide a SIALON based ceramic composite which is particularly suited for the machining of superalloys, steel and cast iron.

It is another object of the invention to provide a ceramic composite containing SIALON which is less reactive with the workpiece than known SIALON composites.

It is a further object of the invention to provide a SIALON ceramic composite containing a uniform dispersion of titanium nitride to improve cutting efficiency.

SUMMARY OF THE INVENTION

The present invention is generally directed to a ceramic composite containing SIALON which is formed from a solid solution of aluminum oxide and aluminum nitride in silicon nitride. The composite also contains an aluminum yttrium garnet phase and titanium nitride.

The present invention is also directed to a mixture of silicon nitride, aluminum oxide, aluminum nitride and titanium nitride which is adapted to be formed into the ceramic composite by heating the mixture under pressure.

In particular, the ceramic composite contains less than 90% by weight SIALON, at least about 9% by weight of yttrium aluminum garnet and up to about 10% by weight of titanium nitride.

The ceramic composite is formed from a mixture containing yttrium oxide in an amount of from about 7 to 15% by weight, alumina in an amount of from about 3 to 10% by weight, aluminum nitride in an amount of from about 3 to 8% by weight, titanium nitride in an amount of up to 10% by weight and the balance silicon nitride.

The above-described mixture is formed into the ceramic composite by subjecting the mixture to conventional techniques for forming ceramic composites such as sintering, hot pressing and hot isotatic pressing. Particularly preferred is sintering under pressure.

DETAILED DESCRIPTION OF THE INVENTION

The SIALON component of the ceramic composite preferably has a ratio of metal atoms to non-metal atoms of about 0.75 that is, the ratio of the sum of silicon and aluminum atoms to oxygen and nitrogen atoms is about 0.75. Preferably the SIALON component has a formula of $Si_{6-z}Al_zO_zN_{8-z}$ wherein Z has a value between about 0.5 and 1.3.

The amount of titanium nitride uniformly distributed in the composite is preferably in the range of from about 2 to 6% by weight, most preferably about 3% by weight.

The composite is formed from a mixture of silicon nitride, alumina (aluminum oxide), aluminum nitride, yttria (yttrium oxide), and titanium nitride. The preferred amount of yttria is from about 8 to 12% by weight, most preferably about 10% by weight. Alumina is preferably employed in amounts of from about 4 to 8% by weight, most preferably about 6% by weight. The amount of aluminum nitride is preferably 4 to 6% by weight, most preferably about 5% by weight. Titanium nitride is preferably provided in the mixture in an amount of from about 2 to 6% by weight, most preferably about 3% by weight. The balance of the mixture is silicon nitride in any amount sufficient to provide a ceramic composite containing SIALON in an amount of less than 90% be weight.

The resulting mixture is consolidated by sintering, hot pressing or by hot isostatic pressing. Sintering under pressure is particularly preferred. In particular, the mixture of silicon nitride, yttria, alumina, aluminum nitride is sintered at a temperature in the range of about 1700 to 1850° C. at a pressure of from about 50 to 3,000 psi, preferably from about 200 to 1,000 psi.

EXAMPLE 1

76 grams of silicon nitride having a mean grain size of 0.3 microns, 10 grams of yttria having a mean grain size of 2.0 microns, 6 grams of alumina (mean grain size 0.3 microns), 5 grams of aluminum nitride having an average surface area of $4m^2/gm$ were mixed with 3 grams of titanium nitride having an average grain size of from 2 to 3 microns. The mixture was ball milled in a tungsten carbide-cobalt ball mill for twenty-four hours with acetone as a milling fluid.

The ground powder was thoroughly dried, transferred to a graphite die and hot pressed at 1750° C. at a pressure of 3,000 psi for one hour. The resulting ceramic composite was found to have a density of 99%+theoretical.

The composite was used to machine a workpiece made of (Inconel 718) under the following conditions: 600 surface feet/min, 0.007" ips feed and 0.200" depth of cut. The sample composite was employed for about 2.25 minutes before evidencing fatigue.

A comparative sample was prepared without titanium nitride in the same manner as the test sample and employed in the same cutting test. The comparative sample evidenced significant fatigue after only 1.5 minutes.

EXAMPLE 2

Samples of the same composition described in Example 1 were ball milled for fifteen hours in a tungsten carbide-cobalt ball mill in the presence of ethanol to thereby form a slurry. The slurry was separated from the ball mill and filtered through a 10 micron sieve and then dried in a rotary evaporator under vacuum conditions.

The dried powder was preformed in a steel die at a pressure of 1,000 psi and then isostatically pressed at 50,000 psi. The pressed samples were placed in a reaction bonded silicon nitride crucible and sintered in a carbon resistance furnace at 1750° C. for forty-five minutes.

The furnace was provided with a 25 psi nitrogen atmosphere during the start up of the sintering procedure. The nitrogen pressure was elevated to 1,500 psi for part of the high temperature cycle and then replaced by an argon atmosphere at 850 psi.

The resulting samples had an average density greater than 99% theoretical and a Rockwell A hardness of 92.5. A metallographic examination showed a uniform dispersion of titanium nitride throughout the samples.

What we claim is:

1. A ceramic composite comprising more than 0% and less than 90% by weight of a single phase silicon aluminum oxynitride, yttrium aluminum garnet in an amount of at least about 9% by weight, and titanium nitride in an amount of more than 0% and up to about 10% by weight.

2. The ceramic composite of claim 1 wherein the ratio of the sum of silicon and aluminum atoms to the sum of oxygen and nitrogen atoms of the silicon aluminum oxyntride is about 0.75.

3. The ceramic composite of claim 2 wherein the silicon aluminum oxynitride has the formula $Si_{6-z}Al_zO_zN_{8-z}$ wherein z has a value between about 0.5 and 1.3.

4. The ceramic composite of claim 1 wherein the amount of titanium nitride is from about 2 to 6% by weight.

5. The ceramic composite of claim 1 wherein the amount of titanium nitride is about 3% by weight.

* * * * *